United States Patent Office 2,802,028
Patented Aug. 6, 1957

2,802,028

PREPARATION OF POLYFLUOROCARBOXYLIC ACIDS AND AMIDES FROM 1,1-DIFLUORO-1-ALKENES, ALKALI METAL CYANIDES AND WATER

David C. England, Wilmington, Del., assignor to E. I. du Pont de Nemours and Company, Wilmington, Del., a corporation of Delaware No Drawing. Application March 28, 1956,
Serial No. 574,393

20 Claims. (Cl. 260—539)

This invention relates to a new chemical process for preparing fluorocarboxylic compounds. More particularly, this invention relates to a new method of preparing polyfluorocarboxylic acids and their amides.

Organic fluorine compounds are assuming increased technical value. Among them, the fluorocarboxylic acids, and especially the polyfluorocarboxylic acids, are particularly important both in themselves and as intermediates for the synthesis of a large variety of other fluoro compounds. Some polyfluorocarboxylic acids are already commercial articles. However, improved methods of preparing these fluorine compounds are constantly being sought.

It is an object of this invention to provide a new chemical process for preparing fluorocarboxylic compounds. A further object is to provide a novel method of preparing polyfluorocarboxylic acids and their amides. Another object is to provide a process for preparing polyfluorocarboxylic acids and their amides from 1,1-difluoro-1-alkenes. Other objects will appear hereinafter.

These and other objects of this invention are accomplished by providing a process for preparing polyfluorocarboxylic acids and their amides which comprises reacting water and an alkali metal cyanide with a 1,1-difluoro-1-alkene having as sole substituents halogen of atomic number 9 to 17 with at least one halogen atom of atomic number 9 to 17 attached to the carbon atom in the 2-position, and obtaining as the product the resulting polyfluorocarboxylic acid or its amide. The reaction mixture is treated with a strong acid to liberate the polyfluorocarboxylic acid from its alkali metal salt and the resulting polyfluorocarboxylic acid and its amide are then isolated from the reaction mixture.

The fluoroolefins suitable for use in the process of this invention have the general formula

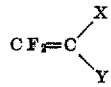

where X is halogen of atomic number 9 to 17, i. e., fluorine or chlorine, and Y is hydrogen, fluorine, chlorine, alkyl, cycloalkyl or alkyl substituted with halogen of atomic number 9 to 17.

The mechanism of this reaction is not known with certainty. Presumably, the cyanide ion and a proton add to the fluoroolefin to form the saturated polyfluoronitrile, which undergoes substantial or even complete hydrolysis to the amide and acid during the reaction, so that no polyfluoronitrile is obtained as such. The reaction mixture generally contains some of the polyfluoroamide, sometimes in substantial amounts, and the polyfluorocarboxylic acid in the form of its alkali metal salt. It also contains ammonia, formed in the hydrolytic reaction leading to the acid. The polyfluorocarboxylic acid is liberated from its salt by treatment of the mixture with a strong mineral acid. This acid treatment usually hydrolyzes at least part of the polyfluoroamide present, so that the final product may consist chiefly or solely of the polyfluorocarboxylic acid, with little or no amide. However, substantial amounts of the polyfluoroamide may be obtained by observing suitable precautions during the acidification treatment. This theory of the reaction is given for a better understanding of the invention and is in no way to be considered a limitation thereof.

The reaction employing potassium cyanide as the alkali metal cyanide may be represented by the overall equations:

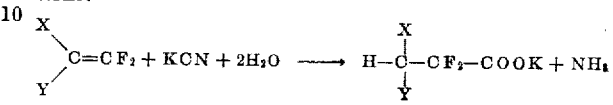

and

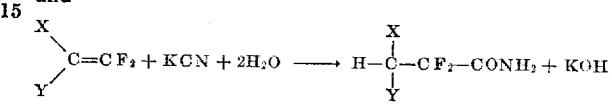

where X is a halogen of atomic number 9 to 17 and Y is hydrogen, fluorine, chlorine, alkyl, cycloalkyl or alkyl substituted solely with halogen of atomic number 9 to 17. It should be noted that the fluoroolefin loses no halogen; that is, there is no replacement of a halogen atom by the cyano group. The cyano group adds to the fluoroolefin and immediately undergoes hydrolysis forming the amide and acid. Thus the resulting products are a saturated aliphatic polyfluorocarboxylic acid and its amide containing one more carbon atom than the 1,1-difluoro-1-alkene reactant.

The fluoroolefins suitable for use in the process of this invention include, for example, tetrafluoroethylene, chlorotrifluoroethylene, hexafluoropropene, 1,1-dichloro-2,2-difluoroethylene, trifluoroethylene, the perfluoroalkenes having a terminal double bond, and the incompletely fluorinated alkenes having a terminal difluoromethylene group such as the alkyltrifluoroethylenes prepared by reacting tetrafluoroethylene with an alkyl lithium as described and claimed in patent application Ser. No. 374,450, filed by Stanley Dixon on August 14, 1953.

Any alkali metal cyanide can be used, including sodium, potassium and lithium cyanides. Sodium cyanide is the most useful because of its high solubility in water and certain organic solvents.

The relative ratios of the reactants are not critical. However, the best yields are obtained when there is present at least one mole of water per mole of alkali metal cyanide. Preferably, there is used at least two moles of water per mole of alkali metal cyanide. If no additional solvent is present, enough water should preferably be used to give a homogeneous solution of the alkali metal cyanide, although it is not essential that the reaction mixture be a homogeneous, one-phase system. In a preferred mode of carrying out the process, there is used, in addition to the water, a water-soluble inert organic liquid reaction medium. This water-soluble inert organic liquid reaction medium should have an essentially equal reaction, and it is preferably free from alcoholic hydroxyls. Such organic solvents, which should be soluble in water to the extent of at least 20% and are preferably water-miscible, include, for example, acetone, acetonitrile, dimethylsulfoxide, dimethylformamide, dimethylacetamide, 1-hydroxy-2-methoxyethane, 1-hydroxy-2-butoxyethane, 1,2-dimethoxyethane, etc. The principal advantage of using such solvents is that they permit the use of a lower reaction temperature and pressure, as compared with water alone.

The amount of fluoroolefin employed is not critical, except to the extent that it largely determines the yield of fluorocarboxylic compound obtained. Any desired amount of fluoroolefin can be used but any excess of it over one mole per mole of alkali metal cyanide will remain unreacted. The end of the reaction can be readily determined, especially when the fluoroolefin is gaseous, since it coincides with the end of the absorption of the fluoroolefin in the reaction mixture.

If desired, there can be used in the reaction mixture a buffer which, in aqueous solution, maintains a pH between about 4 and about 10. The purpose of the buffer is to prevent excessive development of alkalinity due to hydroxyl ion formation during the reaction. The initial reaction mixture is itself basic because of the alkali metal cyanide present. Examples of suitable buffers of this type are sodium dihydrogen phosphate, disodium hydrogen phosphate, acetic acid-sodium acetate mixtures and potassium hydrogen phthalate. The use of such a buffer in the process of this invention does not increase the yield of fluorocarboxylic acid, but it appears to favor the production of the corresponding amide. The buffer can be used in water without organic solvent, or in mixtures of water and organic solvent, or in an organic solvent alone provided the buffer is one which contains sufficient water of crystallization to supply the necessary water. Thus, the water reactant can be supplied in situ from a buffer containing water of crystallization.

The reaction generally proceeds at low or ordinary temperatures, e. g., 0–25° C., without external application of heat, as indicated by absorption of the fluoroolefin. This is particularly the case when a water-miscible, neutral organic solvent is present in the reaction mixture. With some solvents, such as dimethylformamide, the reaction proceeds exothermically. When no organic solvent is used, it is often desirable to raise the reaction temperature, e. g., to 100–150° C., in order for the reaction to proceed at a more practical rate. Thus, the reaction can be carried out at temperatures from 0° to 150° C. or higher. When the fluoroolefin is gaseous, the reaction is most conveniently carried out under a slight pressure of the gas, e. g., superatmospheric pressure of 20–60 lb./sq. in. or higher.

The polyfluorocarboxylic acid is liberated from its alkali metal salt by treating the reaction mixture with an acid. Since the polyfluorocarboxylic acids are themselves strong acids, it is necessary to use a very strong acid having a dissociation constant of at least $2 \times 10^{-1}$. In practice, sulfuric acid or hydrochloric acid, particularly the former, are the preferred acidifying agents. Depending upon the experimental conditions, these acids hydrolyze a greater or lesser amount of the polyfluoroamide present. Under relatively drastic conditions, for example, refluxing in 50% sulfuric acid, the amide is substantially all hydrolyzed and the sole reaction product is the polyfluorocarboxylic acid. Under milder conditions, e. g., acidification at 0° C. or lower, most or all of the amide survives the treatment. If only the amide is desired, the reaction product can be distilled without prior acidification.

The reaction products are isolated from the acidified mixture in any suitable manner, for example by solvent extraction followed by either distillation or crystallization from an appropriate solvent, or by both distillation and crystallization.

The following examples illustrate specific embodiments of the invention.

*Example I*

A stainless steel-lined pressure vessel was charged with 10 g. of sodium cyanide, 30 g. of water and 20 g. of tetrafluoroethylene and heated at 100° C. for 15 hours. The resulting solution, which had a strong odor of ammonia and contained a small amount of a dark solid in suspension, was poured slowly with cooling into 30 cc. of concentrated sulfuric acid. The acidified mixture was extracted with ether and the ether extract was dried and distilled. There was obtained 16 g. (55% yield) of nearly pure 2,2,3,3-tetrafluoropropanoic acid, B. P. 49–51° C. at 20 mm. pressure, $n_D^{25}$ 1.3290.

A sample of 2,2,3,3-tetrafluoropropanoic acid was distilled from an equimolar quantity of phthalic anhydride. The fraction boiling at 133° C. at 760 mm. had a neutralization equivalent 147.5 and a refractive index $n_D^{25}$ 1.3208.

*Analysis.*—Calc'd for $C_3H_2F_4O_2$: C, 24.6; H, 1.4; F, 52.1. Found: C, 24.8; H, 1.7; F, 51.2.

2,2,3,3-tetrafluoropropanoyl chloride, B. P. 38–40° C., was obtained by distilling 2,2,3,3-tetrafluoropropanoic acid from benzoyl chloride. By treatment with aniline in benzene it gave the corresponding anilide, M. P. 67–68° C. after crystallization from cyclohexane.

*Analysis.*—Calc'd for $C_9H_7F_4NO$: C, 48.8; H, 3.2; F, 34.4. Found: C, 48.9; H, 3.1; F, 34.3.

*Example II*

A glass pressure bottle was charged with 10 g. of sodium cyanide, 11 g. of water and 50 cc. of acetonitrile and maintained under a pressure of tetrafluoroethylene at 40 lb./sq. in. at room temperature (about 20° C.). The solution absorbed 20.5 g. of tetrafluoroethylene over a period of 6 hours and darkened in color. It was then poured into a cold solution of 100 cc. of concentrated sulfuric acid in 100 cc. of water. This solution was extracted with ether and the ether extract was dried and distilled. There was obtained 20 g. (68% yield) of nearly pure 2,2,3,3-tetrafluoropropanoic acid.

*Example III*

Example II was repeated, using 50 cc. of dimethylsulfoxide as the organic solvent. The solution absorbed 17.8 g. of tetrafluoroethylene. There was obtained 14 g. of 2,2,3,3-tetrafluoropropanoic acid and 7 g. of a higher boiling material which contained some 2,2,3,3-tetrafluoropropanamide.

*Example IV*

Example II was repeated, using 50 cc. of acetone as the organic solvent. The solution absorbed 16.5 g. of tetrafluoroethylene. There was obtained 14 g. of 2,2,3,3-tetrafluoropropanoic acid and 4 g. of higher boiling material.

*Example V*

A mixture of 60 g. of sodium cyanide, 64.8 g. of water and 100 cc. of dimethylformamide was reacted with tetrafluoroethylene as in Example II. The solution absorbed 113 g. of tetrafluoroethylene. There was obtained 81 g. of 2,2,3,3-tetrafluoropropanoic acid and 73 g. of a 1:1 molar azeotrope of dimethylformamide and 2,2,3,3-tetrafluoropropanoic acid. The total yield of acid was 129.8 g., 74% of theory.

*Example VI*

Example V was repeated except that the charge consisted of 10 g. of sodium cyanide, 50 cc. of dimethylformamide and 11 g. of water. This solution absorbed 22 g. of tetrafluoroethylene exothermically and became only slightly yellow in color. There was obtained 23.8 g. (81% yield) of 2,2,3,3-tetrafluoropropanoic acid.

*Example VII*

A reaction mixture was prepared of 60 g. of sodium cyanide, 20.1 g. of disodium hydrogen phosphate heptahydrate ($Na_2HPO_4.7H_2O$) and 75 cc. of dimethylformamide. No water was added beyond the 9.5 g. of water present in the disodium hydrogen phosphate as water of crystallization. This solution, when pressured with tetrafluoroethylene at about 20° C., absorbed 58 g. of this gas exothermically. Two such runs were combined and worked up as in the preceding examples. Distillation gave two major fractions. The first one (63.8 g.) boiled at 91–94° C. at 20 mm. and had a neutral reaction. Nuclear magnetic resonance data indicated that it was a 1:1 molar azeotrope of dimethylformamide and 2,2,3,3-tetrafluoropropanamide. The latter compound was isolated by treating the azeotrope with a cold (below 0° C.)

solution of 20 cc. of concentrated sulfuric acid in 45 cc. of water, extracting with ether and distilling the extract. This gave 40.4 g. of 2,2,3,3-tetrafluoropropanamide B. P. 86° C. at 20 mm., which solidified to a crystalline product melting at 56–57° C.

*Analysis.*—Calc'd for $C_3H_3F_4ON$: C, 24.8; H, 2.1; F, 52.4; N, 9.65. Found: C, 25.0; H, 2.3; F, 54.1; N, 9.65.

The second fraction of the original distillate (75.7 g.) boiled at 110° C. at 20 mm. pressure. It was a 1:1 molar azeotrope of dimethylformamide and 2,2,3,3-tetrafluoropropanoic acid, as shown by its neutralization equivalent of 217 (theory: 219). The azeotrope was broken by treatment with cold dilute sulfuric acid as above. There was obtained 35 g. of nearly pure 2,2,3,3-tetrafluoropropanoic acid and 15 g. of unchanged azeotrope.

Example VIII

A reaction mixture of 20.1 g. of disodium hydrogen phosphate heptahydrate, 30 g. of sodium cyanide and 75 cc. of dimethylformamide exothermically absorbed 58 g. of tetrafluoroethylene. The reaction mixture was poured into a cold (below $-10°$ C.) solution of 100 cc. of concentrated sulfuric acid in 180 cc. of water. Extraction with ether and distillation gave 25 g. of nearly pure 2,2,3,3-tetrafluoropropanoic acid and 27 g. of crude 2,2,3,3-tetrafluoropropanamide, which on recrystallization from benzene gave 18 g. of pure amide.

Example IX

A mixture of 30 g. of sodium cyanide, 40.2 g. of disodium hydrogen phosphate heptahydrate and 75 cc. of dimethylformamide was pressured with chlorotrifluoroethylene at 40 lb./sq. in. The mixture absorbed exothermically 72.6 g. of chlorotrifluoroethylene. The reaction product was treated as in Example VIII. Distillation gave first 22 g. of 3-chloro-2,2,3,3-trifluoropropanoic acid, B. P. 75° C. at 20 mm. pressure, $n_D^{25}$ 1.3688, neutralization equivalent 166 (theory: 162.5). A second fraction, 15 g., boiling at 101–106° C. at 20 mm. pressure, was an azeotrope of dimethylformamide and 3-chloro-2,2,3-trifluoropropanamide. The last fraction, 9 g., boiling at 115–120° C. at 20 mm. pressure, was an azeotrope of dimethylformamide and 3-chloro-2,2,3,3-trifluoropropanoic acid. A sample of essentially pure 3-chloro-2,2,3-trifluoropropanoic acid gave the following analytical results:

*Aanalysis.*—Calc'd for $C_3H_2ClF_3O_2$: C, 22.2; H, 1.2; F, 35.1. Found: C, 22.7; H, 1.6; F, 34.9.

Example X

A mixture of 60 g. of sodium cyanide, 65 g. of water and 100 ml. of dimethylforamide was treated with chlorotrifluoroethylene at 40 lb./sq. in. pressure. The theoretical amount of gas was absorbed in two hours. The reaction mixture was acidified with 200 ml. of 50% sulfuric acid and the solution was extracted with ether. Distillation of the ether extract gave 26 g. of crude 3-chloro-2,2,3-trifluoropropanoic acid boiling over the range 106–158° C. and 25 g. of essentially pure 3-chloro-2,2,3-trifluoropropanoic acid, B. P. 159–160° C., neutralization equivalent 165. There was also obtained 47 g. of a dimethylformamide/chlorotrifluoropropanamide azeotrope boiling at 187° C.

Example XI

A stainless steel-lined pressure vessel was charged with 10 g. of sodium cyanide, 100 g. of water and 35 g. of hexafluoropropene, $CF_3$—$CF$=$CF_2$. The vessel was heated at 130° C. for 8 hours under the autogenous pressure developed by the reactants, following which the reaction mixture was acidified with 100 ml. of 50% sulfuric acid and extracted with ether. The ether extract was dried and distilled, giving 9.6 g. of 2,2,3,4,4,4-hexafluorobutanoic acid, $CF_3$—$CFH$—$CF_2$—$COOH$, B. P. 138–142° C., neutralization equivalent 203 (theory: 196). The p-chloroaniline salt of this acid melted at 107° C. and had a neutralization equivalent of 322 (theory: 323.5).

*Analysis.*—Calc'd for $C_{10}H_8ClF_6NO_2$: C, 37.2; H, 2.5. Found: C, 37.4; H, 2.7.

Example XII

A mixture of 16.3 g. of n-butyltrifluoroethylene, $C_4H_9CF$=$CF_2$, prepared from butyllithium and tetrafluoroethylene as described in U. S. patent application of Stanley Dixon Ser. No. 374,450, heretofore referred to, 6.5 g. of sodium cyanide, 5 g. of water and 25 ml. of dimethylformamide was sealed in a glass tube. The aqueous and organic layers did not mix at first, but upon heating at 100° C. for 5 hours with occasional shaking the mixture became a homogeneous, dark solution. The reaction mixture was treated as in Example XI. Distillation gave three fractions: (1), 5.7 g. of unreacted butyltrifluoroethylene; (2) 3.5 g. of a liquid boiling at 90–132° C. at 20 mm., which solidified when cooled in ice; and (3) 1.5 g. of a liquid boiling at 132–133° C. at 20 mm., which solidified and melted at 80–81° C. after crystallization from hexane. This solid was shown by analysis to be the amide of 2,2,3-trifluoroheptanoic acid $C_4H_9$—$CHF$—$CF_2$—$CONH_2$.

*Analysis.*—Calc'd for $C_7H_{12}F_3ON$: F, 31.2; N, 7.65. Found: F, 32.6; N, 7.53.

The filtrate from the recrystallization of the amide was mixed with fraction (2) and the composite was dissolved in 10 ml. of concentrated sulfuric acid. The solution was warmed for a few minutes, diluted with 10 ml. of water and extracted with hexane. The hexane solution, after removal of the solvent and distillation, gave 3.5 g. of a hygroscopic product, B. P. 80–86° C. at 1.5 mm. and solid at room temperature. This was 2,2,3-trifluoroheptanoic acid monohydrate, as shown by its neutralization equivalent of 205 (theory: 202) and its nuclear magnetic resonance spectrum.

While the process of this invention has been illustrated with reference to certain specific fluoroolefins, it is broadly applicable to any olefin having a terminal difluoromethylene, $CF_2$=, group, and at least one halogen atom of atomic number 9 to 17 attached to the carbon atom adjacent thereto, any other substituent in the fluoroolefin being halogen of atomic number 9 to 17. The preferred fluoroolefins, because of their greater accessibility, are those having from 2 to 14 carbon atoms. Other suitable fluoroolefins, in addition to those illustrated in the examples, include 1,1-dichloro-2,2-difluoroethylene, $CCl_2$=$CF_2$; 1,1-difluoro-2-chloroethylene, $CF_2$=$CHCl$; methyltrifluoroethylene, $CH_3$—$CF$=$CF_2$; ethyltrifluoroethylene, $C_2H_5$—$CF$=$CF_2$; n-dodecyltrifluoroethylene, $C_{12}H_{25}CF$=$CF_2$; 8-hydroperfluorooctene-1, $H(CF_2)_6$—$CF$=$CF_2$; 12-hydroperfluorododecene-1, $H(CF_2)_{10}$—$CF$=$CF_2$; 1,1,2,3,3-pentafluoro-3-chloropropene-1, $CF_2$=$CF$—$CF_2Cl$; perfluorobutene-1, $C_2F_5$—$CF$=$CF_2$; perfluoropentene-1, $C_3F_7$—$CF$=$CF_2$; perfluoroheptene-1, $C_5F_{11}$—$CF$=$CF_2$; cyclohexyltrifluoroethylene, $C_6H_{11}$—$CF$=$CF_2$; and the like. The best results are obtained with the fluoroolefins of the formula $CF_2$=$CFR$, where R is fluorine, chlorine or trifluoromethyl, and this group of fluoroolefins is therefore preferred.

The fluorocarboxylic acids and amides obtainable by the process of this invention have the general formulas

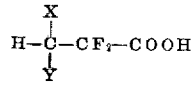

and

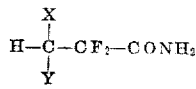

where X is halogen of atomic number 9 to 17, i. e., fluorine or chlorine, and Y is hydrogen, fluorine, chlorine, alkyl, cycloalkyl or alkyl substituted with halogen of atomic number 9 to 17. Thus, from the fluoroalkenes listed above, there can be obtained through the process of this invention the following fluorocarboxylic acids, respectively: 2,2-difluoro-3,3-dichloropropanoic acid, $HCCl_2—CF_2—COOH$; 2,2-difluoro-3-chloropropanoic acid, $H_2ClC—CF_2—COOH$; 2,2,3-trifluorobutanoic acid, $CH_3—CHF—CF_2—COOH$; 2,2,3-trifluoropentanoic acid, $C_2H_5—CHF—CF_2—COOH$; 2,2,3-trifluoropentadecanoic acid, $C_{12}H_{25}—CHF—CF_2—COOH$; 9-hydroperfluorononanoic acid, $H(CF_2)_8—CHF—CF_2—COOH$; 13-hydroperfluorotridecanoic acid, $H(CF_2)_{10}—CHF—CF_2—COOH$; 2,2,3,4,4-pentafluoro-4-chlorobutanoic acid, $ClF_2C—CHF—CF_2—COOH$; 3-hydroperfluoropentanoic acid, $C_2F_5—CHF—CF_2—COOH$; 3-hydroperfluorohexanoic acid, $C_3F_7—CHF—CF_2—COOH$; 3-hydroperfluorooctanoic acid, $C_5F_{11}—CHF—CF_2—COOH$; 2,2,3-trifluoro-3-cyclohexylpropanoic acid, $C_6H_{11}—CHF—CF_2—COOH$; and the corresponding amides.

The polyfluorinated carboxylic acids obtainable by the process of this invention are stable, substantially noninflammable materials which have many important uses. For example, they are useful as water- and grease-repellents for textiles, and gelling agents for inks, greases and waxes. Tetrafluoropropanoic acid is the intermediate for one of the fluoroacyl peroxides of the U. S. Patent 2,559,630, these products being valuable polymerization initiators. The polyfluorinated carboxylic acids, in the form of their metallic salts, and particularly aluminum salts, are useful as ingredients of fluorinated greases. For example, dissolving an aluminum polyfluorocarboxylate in a fluorinated hydrocarbon gives a heat-reversible gel having high film strength with good friction reducing properties, such gels being suitable as lubricants where resistance to heat, chemicals, solvents or oxidation is desired.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing a polyfluorocarboxylic compound from the class consisting of polyfluorocarboxylic acids and their amides which comprises reacting water and an alkali metal cyanide with a 1,1-difluoro-1-alkene having from 2 to 14 carbon atoms and as sole substituents halogen of atomic number 9 to 17 with at least one halogen atom of atomic number 9 to 17 attached to the carbon atom in the 2-position.

2. Process for preparing a polyfluorocarboxylic compound from the class consisting of polyfluorocarboxylic acids and their amides as set forth in claim 1 wherein sufficient water is present in the reaction mixture to maintain a homogeneous solution of said alkali metal cyanide.

3. Process for preparing a polyfluorocarboxylic compound from the class consisting of polyfluorocarboxylic acids and their amides as set forth in claim 1 wherein there is present in the reaction mixture a water-soluble inert organic liquid reaction medium.

4. Process for preparing a polyfluorocarboxylic compound from the class consisting of polyfluorocarboxylic acids and their amides as set forth in claim 1 wherein there is present in the reaction mixture a buffer which in aqueous solution maintains a pH between about 4 and about 10.

5. Process for preparing a polyfluorocarboxylic compound from the class consisting of polyfluorocarboxylic acids and their amides as set forth in claim 1 wherein said alkali metal cyanide is sodium cyanide.

6. Process for preparing a polyfluorocarboxylic compound from the class consisting of polyfluorocarboxylic acids and their amides as set forth in claim 1 wherein said 1,1-difluoro-1-alkene is tetrafluoroethylene.

7. Process for preparing a polyfluorocarboxylic compound from the class consisting of polyfluorocarboxylic acids and their amides which comprises reacting water and an alkali metal cyanide with a 1,1-difluoro-1-alkene having from 2 to 14 carbon atoms and as sole substituents halogen of atomic number 9 to 17 with at least one halogen atom of atomic number 9 to 17 attached to the carbon atom in the 2-position, treating the reaction mixture with a strong mineral acid, and isolating as the resulting product a polyfluorocarboxylic compound from the class consisting of polyfluorocarboxylic acids and their amides.

8. Process for preparing 2,2,3,3-tetrafluoropropanoic acid which comprises reacting water and an alkali metal cyanide with tetrafluoroethylene, treating the reaction mixture with a strong mineral acid, and isolating 2,2,3,3-tetrafluoropropanoic acid as the resulting product.

9. Process for preparing 2,2,3,3-tetrafluoropropanamide which comprises reacting water and an alkali metal cyanide with tetrafluoroethylene, and obtaining 2,2,3,3-tetrafluoropropanamide as the resulting product.

10. Process for preparing a polyfluorocarboxylic compound from the class consisting of 2,2,3,3-tetrafluoropropanoic acid and its amide which comprises reacting water and an alkali metal cyanide with tetrafluoroethylene in a water-soluble inert organic liquid reaction medium, treating the reaction mixture with a strong mineral acid, and isolating as the resulting product a polyfluorocarboxylic compound from the class consisting of 2,2,3,3-tetrafluoropropanoic acid and its amide.

11. Process for preparing a polyfluorocarboxylic compound from the class consisting of 2,2,3,3-tetrafluoropropanoic acid and its amide which comprises reacting an alkali metal cyanide with tetrafluoroethylene in a water-soluble inert organic liquid reaction medium and in the presence of a buffer which prevents excessive development of alkalinity, treating the reaction mixture with a strong mineral acid, and isolating as the resulting product a polyfluorocarboxylic compound from the class consisting of 2,2,3,3-tetrafluoropropanoic acid and its amide.

12. Process for preparing a polyfluorocarboxylic compound from the class consisting of 2,2,3,3-tetrafluoropropanoic acid and its amide which comprises reacting water and sodium cyanide with tetrafluoroethylene, treating the reaction mixture with concentrated sulfuric acid, and isolating as the resulting product a polyfluorocarboxylic compound from the class consisting of 2,2,3,3-tetrafluoropropanoic acid and its amide.

13. Process for preparing a polyfluorocarboxylic compound from the class consisting of polyfluorocarboxylic acids and their amides which comprises reacting water and an alkali metal cyanide with a 1,1-difluoro-1-alkene having from 2 to 14 carbon atoms and as sole substituents halogen of atomic number 9 to 17 with at least one halogen atom of atomic number 9 to 17 attached to the carbon atom in the 2-position, treating the reaction mixture with a strong mineral acid selected from the class consisting of sulfuric and hydrochloric acids, and isolating as the resulting product a polyfluorocarboxylic compound from the class consisting of polyfluorocarboxylic acids and their amides.

14. Process for preparing a polyfluorocarboxylic compound from the class consisting of polyfluorocarboxylic acids and their amides as set forth in claim 13 wherein said alkali metal cyanide is sodium cyanide.

15. Process for preparing a polyfluorocarboxylic compound from the class consisting of polyfluorocarboxylic acids and their amides as set forth in claim 13 wherein there is present in the reaction mixture a water-soluble inert organic liquid reaction medium.

16. Process for preparing a polyfluorocarboxylic compound from the class consisting of polyfluorocarboxylic acids and their amides as set forth in claim 13 wherein there is present in the reaction mixture a buffer which in aqueous solution maintains a pH between about 4 and about 10.

17. Process for preparing a polyfluorocarboxylic compound from the class consisting of 2,2,3,3-tetrafluoropropanoic acid and its amide which comprises reacting water and an alkali metal cyanide with tetrafluoroethylene, treating the reaction mixture with a strong mineral acid selected from the class consisting of sulfuric and hydrochloric acids, and isolating as the resulting product a polyfluorocarboxylic compound from the class consisting of 2,2,3,3-tetrafluoropropanoic acid and its amide.

18. Process for preparing a polyfluorocarboxylic compound from the class consisting of 2,2,3,3-tetrafluoropropanoic acid and its amide as set forth in claim 17 wherein said alkali metal cyanide is sodium cyanide.

19. Process for preparing a polyfluorocarboxylic compound from the class consisting of 2,2,3,3-tetrafluoropropanoic acid and its amide as set forth in claim 17 wherein there is present in the reaction mixture a water-soluble inert organic liquid reaction medium.

20. Process for preparing a polyfluorocarboxylic compound from the class consisting of 2,2,3,3-tetrafluoropropanoic acid and its amide as set forth in claim 17 wherein there is present in the reaction mixture a buffer which in aqueous solution maintains a pH between about 4 and about 10.

No references cited.

UNITED STATES PATENT OFFICE

CERTIFICATE OF CORRECTION

Patent No. 2,802,028                                                            August 6, 1957

David C. England

It is hereby certified that error appears in the printed specification of the above numbered patent requiring correction and that the said Letters Patent should read as corrected below.

Page 1, for the line numbering now appearing in the patent below line 40, reading "5", "10", "15", "20", "25" and "30" read -- 45, 50, 55, 60, 65 and 70 --; column 2, line 57, for "equal" read -- neutral --; column 5, line 36 and lines 43 and 44, Example IX, for "3-chloro-2,2,3,3-trifluoropropanoic acid", each occurrence, read -- 3-chloro-2,2,3-trifluoropropanoic acid --; line 52, Example X, for "dimethylforamide" read -- dimethylformamide --.

Signed and sealed this 22nd day of October 1957.

(SEAL)
Attest:

KARL H. AXLINE
Attesting Officer

ROBERT C. WATSON
Commissioner of Patents